US008346988B2

(12) United States Patent
Li et al.

(10) Patent No.: US 8,346,988 B2
(45) Date of Patent: Jan. 1, 2013

(54) TECHNIQUES FOR DYNAMICALLY SHARING A FABRIC TO FACILITATE OFF-CHIP COMMUNICATION FOR MULTIPLE ON-CHIP UNITS

(75) Inventors: Jian Li, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/786,716

(22) Filed: May 25, 2010

(65) Prior Publication Data
US 2011/0296434 A1  Dec. 1, 2011

(51) Int. Cl.
G06F 3/00 (2006.01)
G06F 13/00 (2006.01)
(52) U.S. Cl. ......... 710/11; 710/2; 710/5; 710/8; 710/15; 710/33
(58) Field of Classification Search ........................ None
See application file for complete search history.

(56) References Cited

U.S. PATENT DOCUMENTS

| | | | |
|---|---|---|---|
| 7,161,906 B2 | 1/2007 | Dell et al. | |
| 7,478,183 B2 | 1/2009 | Pathak et al. | |
| 7,643,493 B1 | 1/2010 | Sayrafian-Pour | |
| 2003/0072312 A1 | 4/2003 | Alasti et al. | |
| 2005/0138258 A1* | 6/2005 | Seto | 710/301 |
| 2006/0013222 A1 | 1/2006 | Rangan et al. | |
| 2007/0110087 A1 | 5/2007 | Abel et al. | |
| 2008/0259798 A1* | 10/2008 | Loh et al. | 370/235 |

FOREIGN PATENT DOCUMENTS

| | | |
|---|---|---|
| WO | 01/90843 A3 | 11/2001 |
| WO | 2005/104568 A3 | 11/2005 |

OTHER PUBLICATIONS

Li, Wei et al.—'Architecture and Performance of a Multi-Tbps Protocol Independent Switching Fabric'—0-7803-6711-1/01—2001 IEEE; 5 pp.
Hill, Chuck—'Peering into RapidIO's Move to the Data Plane'—EE Times, News & Analysis; Motorola Computer Group; Nov. 11, 2003; 7 pp.

* cited by examiner

*Primary Examiner* — Scott Sun
(74) *Attorney, Agent, or Firm* — Yudell Isidore Ng Russell PLLC

(57) ABSTRACT

A technique for sharing a fabric to facilitate off-chip communication for on-chip units includes dynamically assigning a first unit that implements a first communication protocol to a first portion of the fabric when private fabrics are indicated for the on-chip units. The technique also includes dynamically assigning a second unit that implements a second communication protocol to a second portion of the fabric when the private fabrics are indicated for the on-chip units. In this case, the first and second units are integrated in a same chip and the first and second protocols are different. The technique further includes dynamically assigning, based on off-chip traffic requirements of the first and second units, the first unit or the second unit to the first and second portions of the fabric when the private fabrics are not indicated for the on-chip units.

16 Claims, 4 Drawing Sheets

TECHNIQUES FOR DYNAMICALLY SHARING A FABRIC TO FACILITATE OFF-CHIP COMMUNICATION FOR MULTIPLE ON-CHIP UNITS

BACKGROUND

This disclosure relates generally to dynamically sharing a fabric and, more specifically, to dynamically sharing a fabric to facilitate off-chip communication for multiple on-chip units.

In the electronics field, a multiplexer is a device that selects from among multiple inputs (or input groups) and forwards a selected input (or selected input group) to an output (or output group). In general, a multiplexer that has $2^n$ inputs has 'n' select lines, which are used to select which input to route to the output. A multiplexer facilitates sharing a resource, for example an input/output (I/O) pin, between inputs and/or outputs instead of requiring a resource for each input and/or output. In general, a demultiplexer is a device that has a single input (or input group) which is routed to one of multiple outputs (or output groups). A multiplexer can be viewed as a multiple-input/single-output switch and a demultiplexer can be viewed as a single-input/multiple output switch.

A number of prior art references disclose devices that share pins of an integrated circuit (or chip) via multiplexing. For example, U.S. Patent Application Publication No. 2006/0101173 discloses an advanced technology attachment (ATA) device that shares a portion of its pins with other peripheral devices. As another example, U.S. Patent Application Publication No. 2005/0223121 disclose devices that multiplex among 'M' pin groups, where N>M. As yet another example, U.S. Patent Application Publication No. 2006/0132178 discloses multiple devices, each of which has dedicated pins that share a pin group.

In computing and telecommunications, a protocol is a formal description of a message format and rules for exchanging messages. A protocol may include signaling, authentication, and error detection and correction capabilities. In general, a protocol defines rules governing syntax, semantics, and synchronization of a message. A protocol may be implemented by hardware, software, or a combination of hardware and software. At a lowest level, a protocol defines hardware connection behavior.

SUMMARY

According to one aspect of the present disclosure, a technique for sharing a fabric to facilitate off-chip communication for multiple on-chip units includes dynamically assigning a first unit (that implements a first communication protocol) to a first portion of the fabric, when private fabrics are indicated for the on-chip units. The technique also includes dynamically assigning a second unit (that implements a second communication protocol) to a second portion of the fabric, when the private fabrics are indicated for the on-chip units. In this case, the first and second units are integrated in a same chip and the first and second protocols are different. The technique further includes dynamically assigning, based on off-chip traffic requirements of the first and second units, the first unit or the second unit to the first and second portions of the fabric, when the private fabrics are not indicated for the on-chip units.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
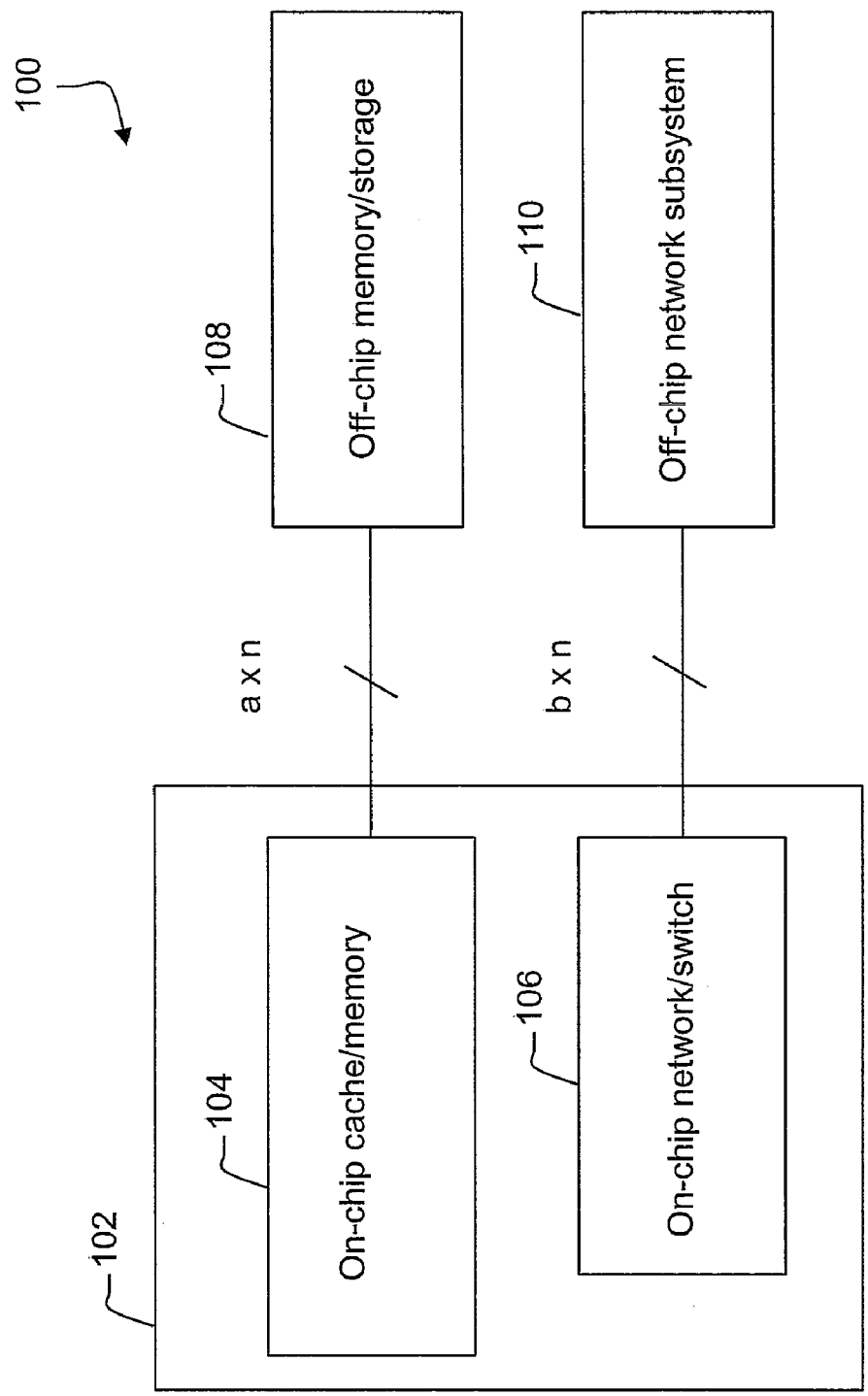
FIG. 1 is a block diagram of relevant portion of a conventional data processing system that includes a chip whose on-chip units are statically assigned to input/output (I/O) pins for off-chip communication.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components, achieved using one or more intervening blocks or components. As used herein, the term "fabric" refers to an architecture used to interconnect electronic devices and may also be referred to herein as a pin group or an interconnect.

As noted above, pin sharing (via multiplexing) is commonly utilized to address the problem of limited input/output (I/O) pin count for integrated circuits (or chips). While the above-identified publications disclose devices that share pins, none of the publications disclose devices that are reconfigurable based on traffic characterization. As chips implement more advanced functionality and compute capacity (e.g., multi-core, simultaneous multithreading (SMT), and system on chip (SOC) technologies) to increase computing capacity, the demand for off-chip communication has generally increased. However, off-chip communication has generally been constrained due to a chip having a limited I/O pin count. For example, while on-chip computing improvement has generally been super-linear with chip perimeter, pin count has essentially been linear with chip perimeter. Moreover, chips are increasingly implementing units that employ different protocols, which usually result in different levels of associated off-chip traffic. For example, one can specify implementation of an optical fabric that handles multiple protocols.

According to the present disclosure, a reconfigurable fabric (that may employ arbitration) that facilitates off-chip communication for multiple protocols is dynamically configured to increase bandwidth and reduce latency associated with off-chip communication. In various embodiments, the reconfigurable fabric may provide a private fabric for each on-chip unit or the private fabrics for multiple on-chip units may be utilized by a single on-chip unit in view of bandwidth and latency requirements. In general, the reconfigurable fabric provides improvement in off-chip bandwidth for applications with large messages, while minimizing performance degradation for applications with short messages. It should be appreciated that the reconfigurable fabric does not simply support multiple traffic/signals/messages/protocols on the same fabric, pins, and/or interconnect.

Techniques according to the present disclosure facilitate reconfiguring a fabric to arbitrate traffic (i.e., signals or messages) provided from multiple on-chip units. In this manner, routing messages (traffic) based on bandwidth and latency requirements generally improves overall message delivery time. In general, the fabric facilitates time-sharing between different protocols when associated traffic is not concurrent and demands relatively high-bandwidth (e.g., relatively large and non-overlapping messages). In this case, one of the on-chip units utilizes its own private fabric and at least a portion of a private fabric of another on-chip unit when performing off-chip communication. Techniques according to the present disclosure also facilitate prioritizing time-sharing for traffic based on priority signals from on-chip units. Furthermore, the reconfigurable fabric may be partitioned into private fabrics for each of the on-chip units to improve latency, when data communications associated with the on-chip units are concurrent and not bandwidth demanding (e.g., short and concurrent messages). In this case, arbitration and buffering of messages for each on-chip unit may be bypassed.

According to the present disclosure, additional circuitry for sharing private fabrics between on-chip units is relatively small, assuming the private fabrics support a limited set of different protocols. In a shared scheme (i.e., when private fabrics are shared between on-chip units), extra initial latency overhead of large messages is amortized by high-bandwidth capacity (i.e., more pins) and, as such, a delivery time for larger messages is generally reduced. When the fabric implements a private scheme, an arbiter (Arb) and multiplexer (Mux) may be bypassed and, in this case, the fabric is reduced to relatively fast private fabrics for improved short message delivery time. It should be appreciated that any implemented control pin (or pins) may be shared with other control pins and that priority levels between traffic may be limited to a reasonable number, e.g. two priority levels.

With reference to FIG. 1, a relevant portion of an example conventional system 100 is illustrated in which a chip 102 includes an on-chip cache/memory unit 104 and an on-chip network/switch unit 106. The unit 104 performs off-chip communication (via an 'axn' bus) with an off-chip memory/storage unit 108. The unit 106 performs off-chip communication (via a 'bxn' bus) with an off-chip network subsystem unit 110. In this case, the system 100 has employed static pin assignment for the off-chip communications. That is, each of the units 104 and 106 has only utilized dedicated pins for off-chip communication.

Figure 2:
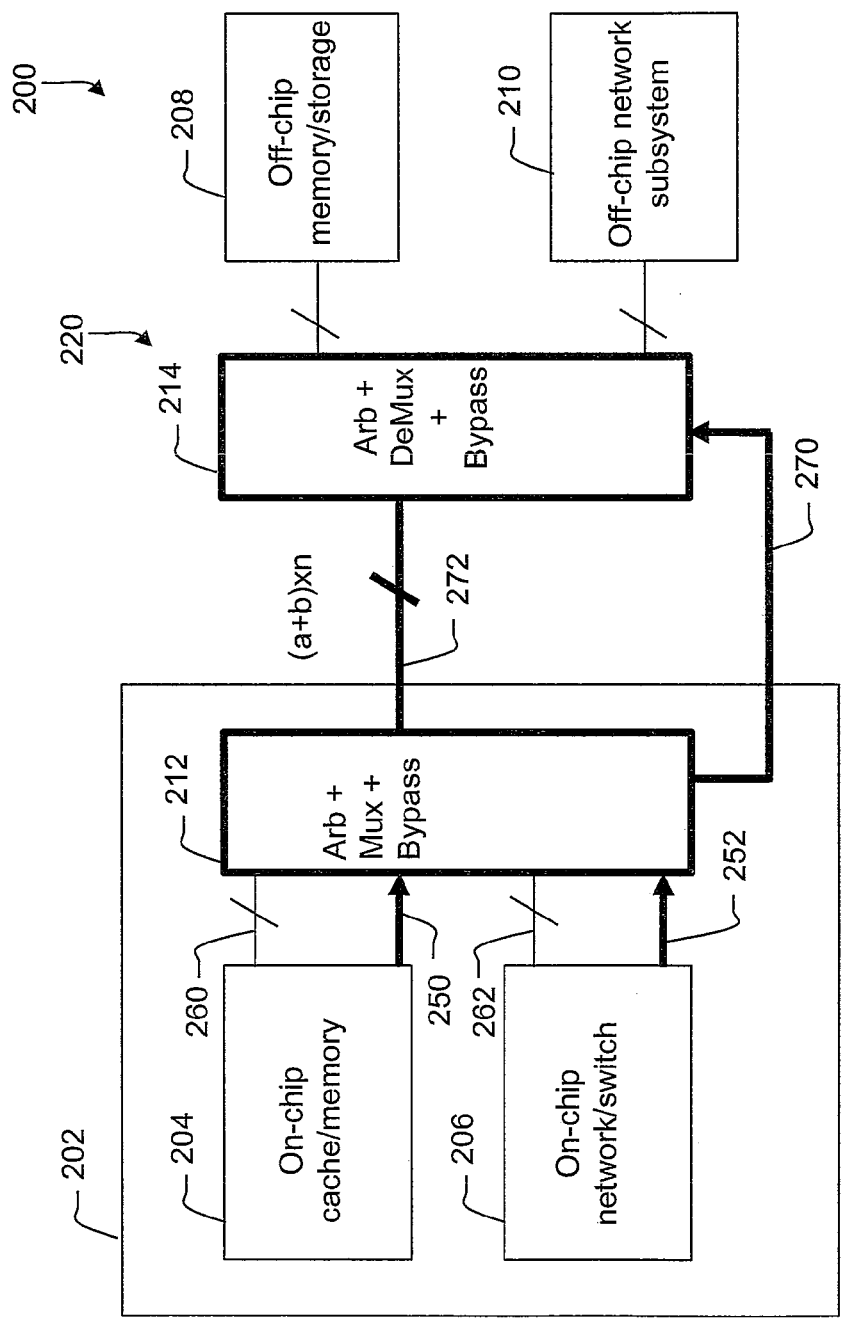
FIG. 2 is a block diagram of relevant portion of an example data processing system that includes a chip whose on-chip units are dynamically assigned to I/O pins for off-chip communication using a fabric configured according to an embodiment of the present disclosure.

With reference to FIG. 2, a relevant portion of an example system 200 (which may represent a data processing system), configured according to the present disclosure, employs a fabric 220 (which includes an on-chip arbiter, multiplexer, and bypass unit 212 and an off-chip arbiter, demultiplexer, and bypass unit 214) to facilitate off-chip communication for on-chip cache/memory unit 204 and on-chip network/switch unit 206, which are include within chip 202. The unit 204 may perform off-chip communication with an off-chip memory/storage unit 208 via an 'a×n' bus (e.g., a 32-bit bus) or an '(a+b)n' bus 272 (e.g., a 64-bit bus). The unit 206 performs off-chip communication with an off-chip network subsystem unit 210 via a 'b×n' bus (e.g., a 32-bit bus) or the '(a+b)n' bus 272 (e.g., a 64-bit bus). It should be appreciated that the system 200 employs dynamic pin assignment for the off-chip communications. That is, each of the units 204 and 206 may utilize any portion of the '(a+b)n' bus 272 for off-chip communication.

As is shown, the unit 212 is integrated within the chip 202. A control bus 250 (which includes one or more control lines) is coupled between the unit 204 and the unit 212 and a control bus 252 (which includes one or more control lines) is coupled between the unit 206 and the unit 212. A bus 260 (e.g., a 32-bit bus) is coupled between the unit 204 and the unit 212 and a bus 262 is (e.g., a 32-bit bus) is coupled between the unit 206 and the unit 212. A control bus 270 (which includes one or more control lines) is coupled between the unit 212 and the unit 214. The bus 270 carries signals that indicate where information on the bus 272 should be routed (i.e., whether the information should be routed to the unit 208, the unit 210, or if the bus 272 carries data for both the unit 208 and the unit 210). It should be appreciated that units similar to the units 212 and 214 are also required to transfer data from the units 208 and 210 to the units 204 and 206, respectively. The control units for each direction may share structures and wires. It should also be appreciated that more than two on-chip units may be integrated in a chip configured according to the present disclosure.

Figure 3:
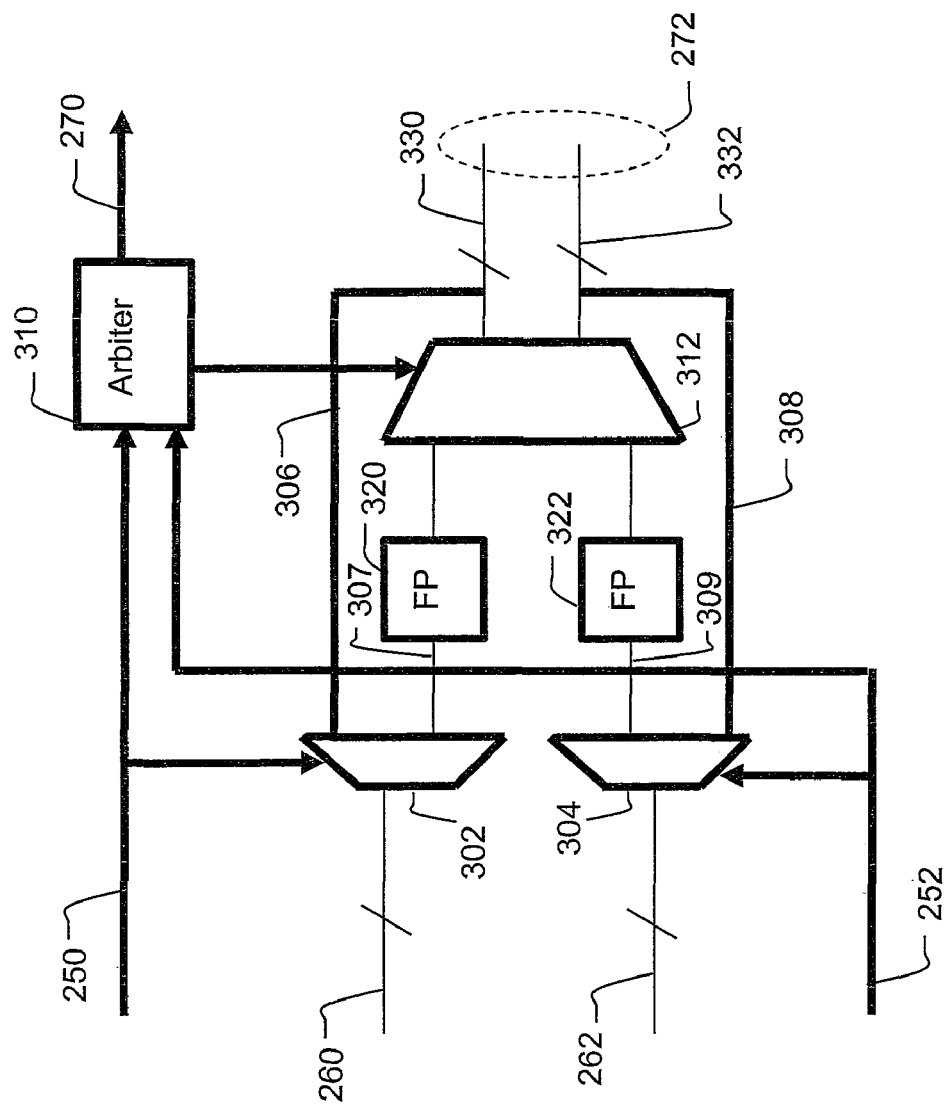
FIG. 3 is a block diagram of relevant portion of the fabric of FIG. 2.

With reference to FIG. 3, the unit 212 is illustrated in further detail. As is shown, the bus 250 is coupled to a demultiplexer 302 and an arbiter 310. Responsive to signals provided by the unit 204 (on the bus 250), information provided on the bus 260 may be routed (via the demultiplexer 302) to the bus 330 (which is part of the bus 272 that is dedicated to the unit 204 when a private off-chip communication mode is indicated) via bus 306 or to flit pack (FP) 320 via bus 307. As is used herein, a flit is a basic unit of a message to be transferred over a fabric (in the discussion herein a flit corresponds to two units). The FP 320 is essentially a buffer that provides information (from the unit 204) on bus 272 (via demultiplexer 312) when the unit 204 is utilizing the bus 272 in a shared off-chip communication mode (e.g., when the unit 204 is utilizing all of the bus 272 (which includes the bus 330 and bus 332) to transfer information off-chip).

The signals provided by the unit 204 (on the bus 250) are also provided to the arbiter 310. The arbiter 310 decides which of the units 204 and 206 can utilize the bus 272 when the shared off-chip communication mode is indicated and accordingly controls the demultiplexer 312 to provide information from one of the units 204 and 206 on the bus 272. The arbiter 310 also provides an indication (on control bus 270) of where information on the bus 272 should be routed by the unit 214 (i.e., whether the information on the bus 330 should be routed to the unit 208 and the information on the bus 332 should be routed to the unit 210 or whether the information on the bus 272 should be routed to the unit 208 or the unit 210).

The bus 252 is coupled to a demultiplexer 304 and the arbiter 310. Responsive to signals provided by the unit 206 (on the bus 252), information provided on the bus 262 may be routed (via the demultiplexer 304) to the bus 332 (which is part of the bus 272 that is dedicated to the unit 206 when a private off-chip communication mode is indicated) via bus 308 or to flit pack (FP) 322 via bus 309. The FP 322 is essentially a buffer that provides information (from the unit 206) on the bus 272 (via the demultiplexer 312) when the unit 206 is utilizing the bus 272 in a shared off-chip communication mode (i.e., when the unit 206 is utilizing all of the bus 272 to transfer information off-chip). The signals provided by the unit 206 on the bus 252 are also provided to the arbiter 310. As above, the arbiter 310 decides which of the units 204 and 206 can utilize the bus 272 when the shared off-chip communication mode is indicated and accordingly controls the demultiplexer 312 to provide information from one of the units 204 and 206 on the bus 272.

The arbiter also provides an indication (on the bus 270) as to where information on the bus 272 should be routed by the unit 214 (i.e., whether the information on the bus 272 includes information that should be routed to the unit 208 and information that should be routed to the unit 210 or whether the information on the bus 272 should be routed to the unit 208 or the unit 210). It should be appreciated that in the private off-chip communication mode the partitioning of the bus 272 into the buses 330 and 332 is not static. In one illustrative embodiment, the bus 272 has sixty-four (64) pins and the bus 330 has thirty-two (32) pins and the bus 332 has thirty-two (32) pins. In another embodiment, the bus 272 has sixty-four (64) and the bus 330 has forty-eight (48) pins and the bus 332 has sixteen (16) pins. In general, the bus 330 can include zero to 'X' pins (for example, 'X' may be equal to 2, 4, 8, 16, 32, 64, 128, 256) and the bus 332 includes the remaining pins (i.e., the pins not included in the bus 330). In this case, a bus with zero pins indicates that an associated unit is not allowed off-chip communication.

In various embodiments, portions of the bus 272 and their associated control and buffer circuitry (including other related pins and associated circuitry) may be turned off to reduce power consumption in either private or shared off-chip communication modes.

Figure 4:
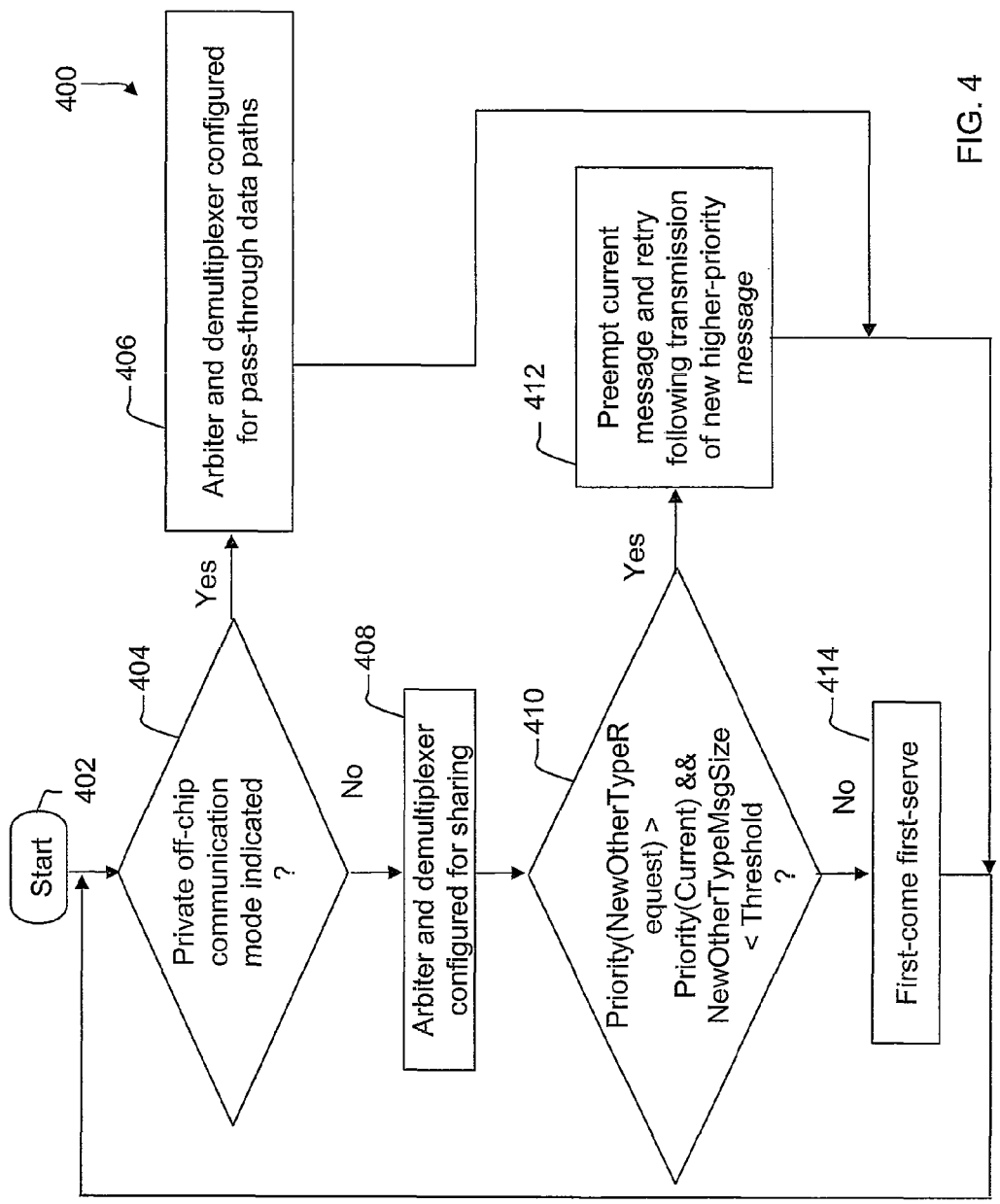
FIG. 4 is a flowchart of a process for dynamically assigning I/O pins for off-chip communication according to an embodiment of the present disclosure.

With reference to FIG. 4, an example process 400, for dynamically assigning I/O pins for off-chip communication according to an embodiment of the present disclosure, is illustrated. The process is initiated at block 402, at which point control transfers to decision block 404. In block 404, the process 400 determines whether a private off-chip communication mode is indicated (e.g., when off-chip communications have low-bandwidth requirements for all types of off-chip traffic, a private off-chip communication mode is indicated). If a private off-chip communication mode is indicated in block 404, control transfers to block 406, where the arbiter 310 and the demultiplexers 302 and 304 are configured for pass-through data paths.

Following block 406, control returns to block 404. If a private off-chip communication mode is not indicated in block 404 (i.e., mostly non-overlapping off-chip communication requests from different types of on-chip units are expected), control transfers to block 408, where the arbiter 310 and the demultiplexers 302 and 304 are configured for sharing (i.e., either the unit 204 or the unit 206 may utilize all of the bus 272 for off-chip communications at any given point in time). Next, in decision block 410, the process 400 determines whether a new other type of request (that is different than the type of a current message that is being transmitted off-chip) has a priority that is higher than the current message and a message size of the new other type of request is less than a threshold value.

If the condition is true in block 410, control transfers to block 412, where the current message is preempted for transmission of the message associated with the new other type of request. Following the transmission of the message for the new other type of request, transmission of the current message is retried and control transfers to block 404. If the condition is not true in block 410, control transfers to block 414 where the message is transmitted off-chip on a first-come first-serve (FCFS) basis, at which point control transfers to block 404, while the process 400 is active. In addition, scheduling approaches other than FCFS may be employed as desired.

In various embodiments, a workload-aware reconfiguration of a fabric is employed. For example, when workloads are known to have low-bandwidth requirements for all types of off-chip traffic, a private off-chip communication mode is selected. When workloads have high-bandwidth requirements for all types of off-chip traffic, a shared off-chip communication mode is selected. In the shared off-chip communication mode mostly non-overlapping off-chip communication requests from different types of on-chip units are expected. In this case, on-chip units may be allocated the shared communication bus on a first-come first-serve (FCFS) basis or on a different basis, as desired. The shared communication bus may also be allocated on an FCFS basis for other cases to simplify control. In one embodiment, when a priority basis is employed, only higher-priority and short other-type messages are allowed to preempt a current message transmission (which is later retried). It should be appreciated that other workload-aware arbitration and reconfiguration techniques may be implemented according to the present disclosure.

The disclosed techniques are applicable to address and data pins, on-chip interconnect fabric, and optical or electrical fabrics. According to the present disclosure, hardware support is provided to arbitrate messages of different protocol types over the same fabric. The disclosed techniques may also arbitrate based on traffic characterization, e.g. message size and priority. According to the present disclosure, hardware support is also provided to reconfigure data paths for a shared fabric and pass-through data paths for dedicated fabrics.

Accordingly, a number of techniques have been disclosed herein that generally improve off-chip communication for multiple on-chip units.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of sharing a fabric to facilitate off-chip communication for on-chip units, comprising:
dynamically assigning a first unit that implements a first communication protocol to a first portion of the fabric when private fabrics are indicated for the on-chip units;
dynamically assigning a second unit that implements a second communication protocol to a second portion of the fabric when the private fabrics are indicated for the on-chip units, wherein the first and second units are integrated in a same chip and the first and second protocols are different; and
dynamically assigning, based on off-chip traffic requirements of the first and second units, the first unit or the second unit to the first and second portions of the fabric when the private fabrics are not indicated for the on-chip units.

2. The method of claim 1, wherein the first unit includes a memory/storage unit and the second unit includes a network/switch unit.

3. The method of claim 1, wherein the private fabrics are indicated when the off-chip traffic has a bandwidth requirement below a predetermined value.

4. The method of claim 1, wherein the private fabrics are not indicated when the off-chip traffic has a bandwidth requirement above a predetermined value.

5. The method of claim 1, wherein the dynamically assigning, based on off-chip traffic requirements of the first and second units, the first unit or the second unit to the first and second portions of the fabric when the private fabrics are not indicated for the on-chip units further comprises:
dynamically assigning, based on the off-chip traffic requirements of the first and second units and respective priorities of the first and second units, the first unit or the second unit to the first and second portions of the fabric when the private fabrics are not indicated for the on-chip units.

6. The method of claim 1, wherein the dynamically assigning, based on off-chip traffic requirements of the first and second units, the first unit or the second unit to the first and second portions of the fabric when the private fabrics are not indicated for the on-chip units further comprises:

dynamically assigning, based on off-chip traffic requirements of the first and second units and on a first-come first-serve basis, the first unit or the second unit to the first and second portions of the fabric when the private fabrics are not indicated for the on-chip units.

7. The method of claim 1, wherein the dynamically assigning, based on off-chip traffic requirements of the first and second units, the first unit or the second unit to the first and second portions of the fabric when the private fabrics are not indicated for the on-chip units further comprises:

preempting a current message transmission of the first unit when the second unit has a higher priority message whose length is below a threshold size;

transmitting, by the second unit, the higher priority message following preemption of the current message transmission; and transmitting, by the first unit, the preempted current message following transmission of the higher priority message.

8. A chip, comprising:
a first unit;
a second unit; and
a fabric coupled to the first and second units, wherein the fabric is configured to facilitate off-chip communication for the first and second units by:

dynamically assigning the first unit, which implements a first communication protocol, to a first portion of the fabric when private fabrics are indicated for the units;

dynamically assigning a second unit, which implements a second communication protocol, to a second portion of the fabric when the private fabrics are indicated for the units, wherein the first and second protocols are different; and dynamically assigning, based on off-chip traffic requirements of the first and second units, the first unit or the second unit to the first and second portions of the fabric when the private fabrics are not indicated for the first and second units.

9. The chip of claim 8, wherein the first unit includes a memory/storage unit and the second unit includes a network/switch unit.

10. The chip of claim 8, wherein the private fabrics are indicated when the off-chip traffic has a bandwidth requirement below a predetermined value.

11. The chip of claim 8, wherein the private fabrics are not indicated when the off-chip traffic has a bandwidth requirement above a predetermined value.

12. The chip of claim 8, wherein the dynamically assigning, based on off-chip traffic requirements of the first and second units, the first unit or the second unit to the first and second portions of the fabric when the private fabrics are not indicated for the on-chip units further comprises:

dynamically assigning, based on the off-chip traffic requirements of the first and second units and respective priorities of the first and second units, the first unit or the second unit to the first and second portions of the fabric when the private fabrics are not indicated for the on-chip units.

13. The chip of claim 8, wherein the dynamically assigning, based on off-chip traffic requirements of the first and second units, the first unit or the second unit to the first and second portions of the fabric when the private fabrics are not indicated for the on-chip units further comprises:

dynamically assigning, based on off-chip traffic requirements of the first and second units and on a first-come first-serve basis, the first unit or the second unit to the first and second portions of the fabric when the private fabrics are not indicated for the on-chip units.

14. The chip of claim 8, wherein the dynamically assigning, based on off-chip traffic requirements of the first and second units, the first unit or the second unit to the first and second portions of the fabric when the private fabrics are not indicated for the on-chip units further comprises:

preempting a current message transmission of the first unit when the second unit has a higher priority message whose length is below a threshold size;

transmitting, by the second unit, the higher priority message following preemption of the current message transmission; and transmitting, by the first unit, the preempted current message following transmission of the higher priority message.

15. The chip of claim 8, wherein the chip is included in a data processing system.

16. The chip of claim 8, wherein the chip is embodied in one or more design files included on a non-transitory computer readable storage medium.

* * * * *